March 7, 1961 R. L. HOOVER 2,974,280
METHOD OF ELECTRIC TIMING AND APPARATUS FOR SAME
Filed Sept. 20, 1954 3 Sheets-Sheet 3

INVENTOR.
ROBERT L HOOVER
BY
ATTORNEY 2,974,280
Patented Mar. 7, 1961

2,974,280

METHOD OF ELECTRIC TIMING AND APPARATUS FOR SAME

Robert L. Hoover, 3077 E. Shadowland Ave. NE., Atlanta, Ga.

Filed Sept. 20, 1954, Ser. No. 457,219

15 Claims. (Cl. 324—68)

The present invention relates to a timing circuit, and more particularly relates to a coincidence counter circuit having great accuracy and utilizing the effect given off by two differently charged particles during collision thereof.

It is, accordingly, an object of the present invention to provide a measuring circuit for measuring the time between pulses.

It is another object of the present invention to provide a pulse counter circuit which is very accurate and which permits the measuring of the coincidence of pulses to within $10^{-12}$ seconds or better.

It is another object of the present invention to provide an apparatus which permits measuring of the time of the triggering of pulses to less than $10^{-12}$ seconds.

A further object of the present invention is to provide a counting network which is not limited by the inherent tube limitations of present-day counting circuits.

A still further object of the present invention is the provision of a counting network comprising a vacuum tube including two guns for emitting particles having different charges, such as electrons and positrons, into each other's path so that upon interaction by collision of two differently charged particles an indication will be given off to indicate such collision.

Another object of the present invention resides in the provision of a time determining circuit in which the effect of collision between electrons and positrons is used to determine the time by noting the gamma radiation produced by such collision.

Another object of the present invention is to provide a counting network which will greatly improve radar techniques.

Another object of the present invention is the provision of an electronic circuit in which the annihilation quanta produced by the collision of a positron with an electron are used to indicate coincidence of two pulses or to measure the time therebetween.

Figure 1:
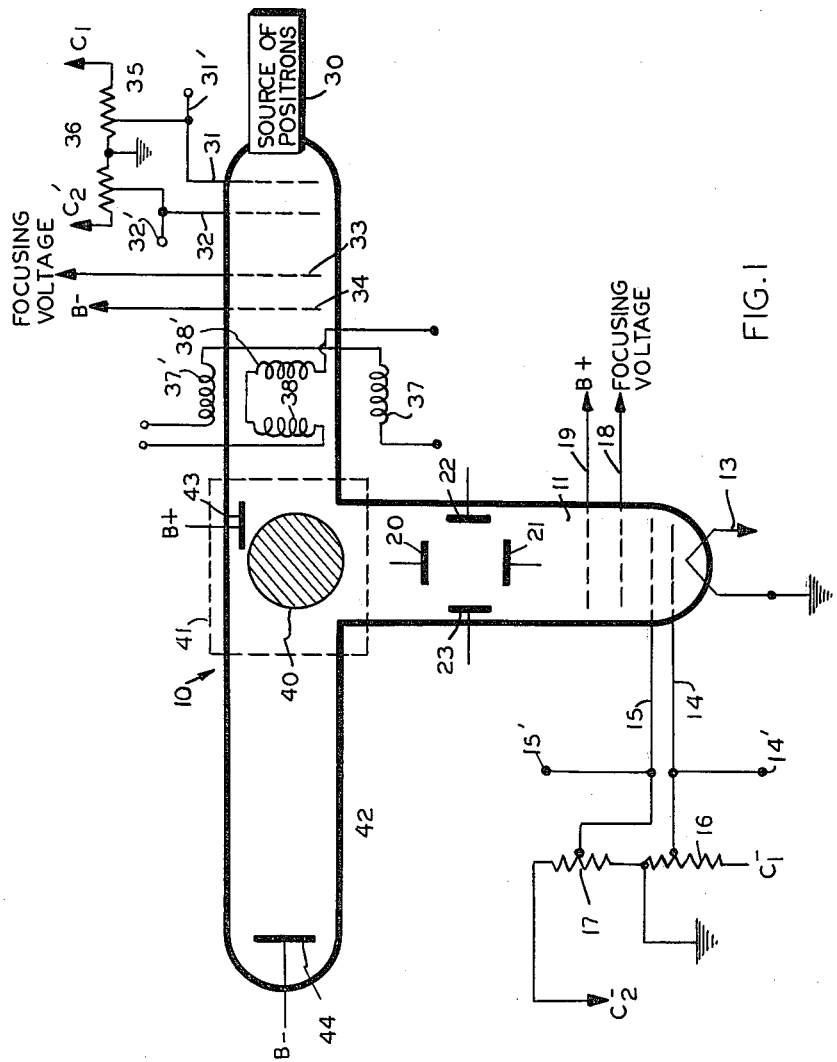
Figure 2:
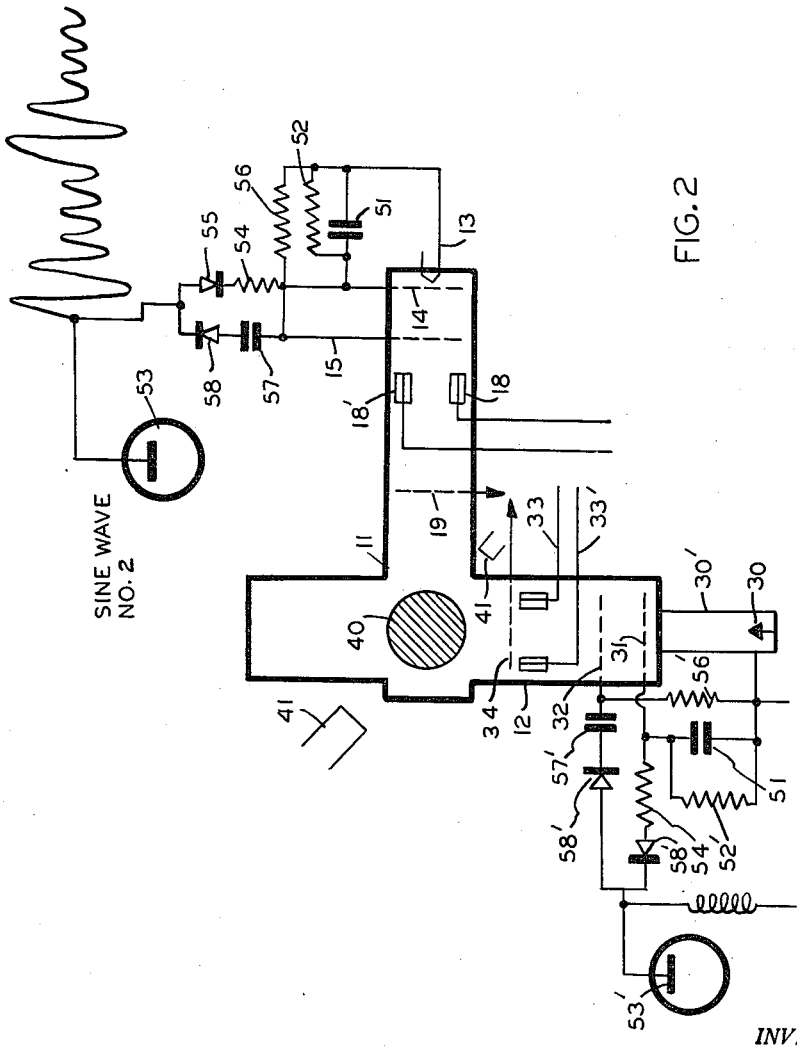
Figure 3:
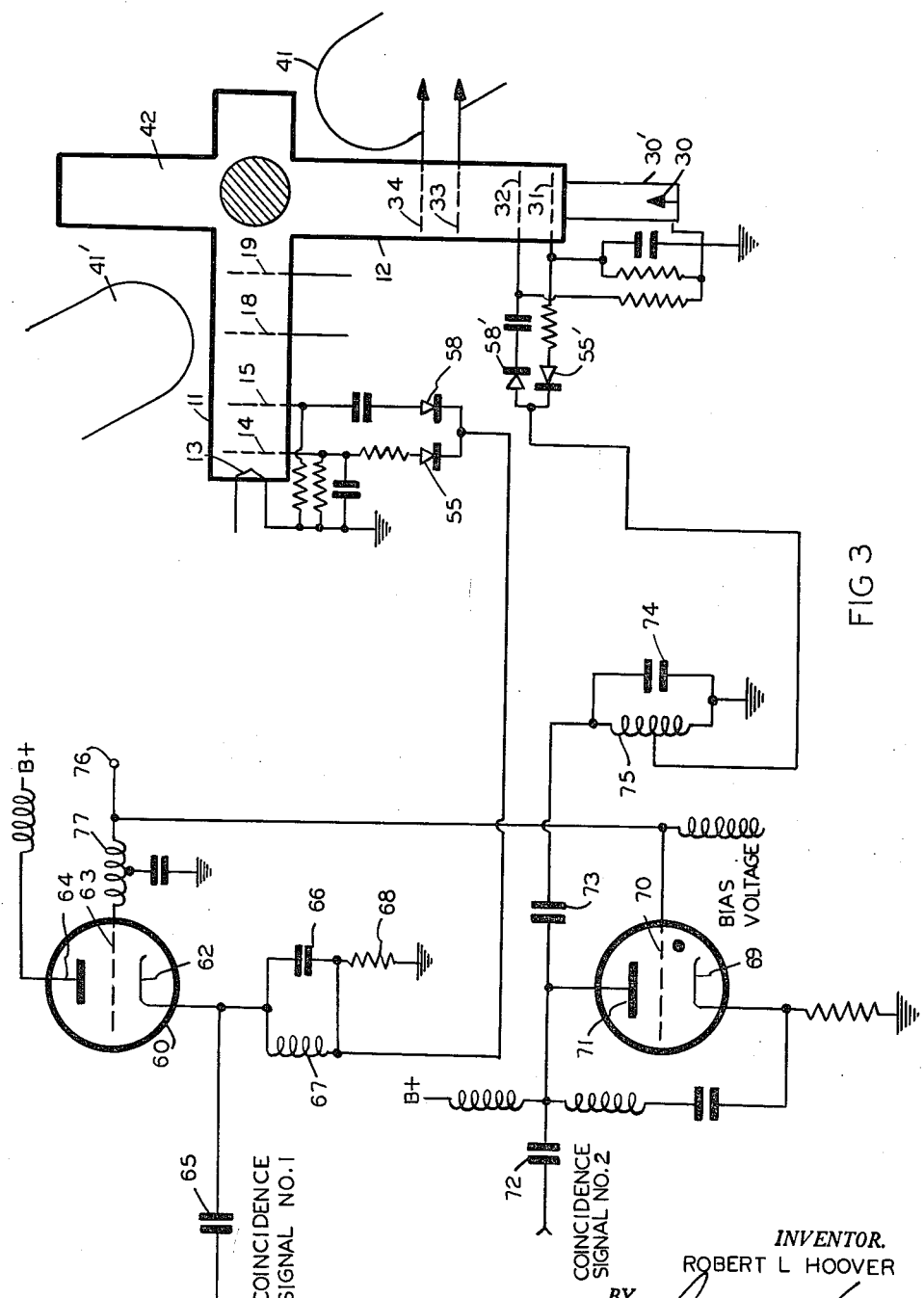

These and other objects and advantages of the present invention will become more obvious from the following description when taken in connection with the accompanying drawing which shows for purposes of illustration only several preferred embodiments in accordance with the present invention, and wherein:

Figure 1 is a schematic diagram of one embodiment of an electronic timing circuit in its most general form in accordance with the present invention, Figure 2 is a schematic diagram another embodiment illustrated schematically of an electronic timing circuit in accordance with the present invention, and Figure 3 is another schematic diagram of a still further embodiment in accordance with the present invention.

Briefly stated, the present invention utilizes the phenomenon of annihilation which takes place when a positron comes in contact with an electron at which time X-rays or gamma rays are given off, the energy of which is about 511,000 electron volts.

The electronic apparatus in accordance with the present invention uses this physical phenomenon by observing the presence of X-rays or gamma rays which are produced during the contact by a positron and an electron. By focusing a stream of positrons and a stream of electrons into each other's path, and by knowing the speed of both the electrons and positrons, it is possible to determine whether these two streams arrive at about the same time at the point of intersection of their respective paths by the presence or absence of gamma rays. By triggering the stream of positrons and that of electrons with two known pulses, it is possible to determine the time of triggering to within less than $10^{-12}$ seconds.

Referring now more particularly to the drawing wherein like reference numerals are used throughout the various views to designate like parts, reference numeral 10 shows an electron tube which is provided with two separate guns or portions 11 and 12 for the paths of electrons and positrons, respectively. The actual geometric layout of the two guns and of the two portions of the vacuum tube may be made in any appropriate manner as long as the paths of the electron stream and of the positron stream intersect before they strike the plate located at the end of their respective paths. The tube portion 11 for the stream of electrons includes a source of electrons 13 which may be a conventional directly heated cathode coated with any suitable electron emissive material. Of course, any other type of electron source, such as an indirectly heated cathode may also be used. This portion 11 of the tube 10 further comprises a plurality of control electrodes 14 and 15 to which may be applied suitable bias voltages from any appropriate bias source, as, for example, from adjustable potentiometer networks 16 and 17 which are connected across bias voltages $C_1$ and $C_2$.

The portion 11 of the tube 10 further comprises a focusing electrode 18 which may be connected to any suitable, preferably adjustable, source of focusing voltage (not shown). The intensity grid 19 is connected to the positive high voltage power supply $B^+$, preferably also in a manner to provide proper adjustment thereof.

Focusing of the electron stream may thus be obtained by varying the potential on the focusing electrode, as is well known in connection with electron gun tubes.

If further adjustments or variations of the electron beam is desired two pairs of electrostatic deflection plates 20 and 21, and 22 and 23 may be provided to effect movement of the electron beam in any direction substantially perpendicular to its direction of travel. It is understood, however, that electromagnetic deflection coils may be used instead of the electrostatic plates 20–23. The deflection means, whether electrostatic or electromagnetic, may be located either inside or outside the portion 11 of tube 10.

The grids 14 and 15 constitute control grids the use of which will be described more fully hereinafter.

The portion 12 of tube 10 comprises any conventional source 30 of positrons, as used nowadays in nuclear work, such as a radioactive supply of decaying nuclides. The source may be located entirely or only partially within the tube portion 12.

A typical example for a source of positrons may be a block-like base of lead at which high powered gamma rays are fired thereby producing pair production. The gamma rays may come from some source outside of the tube or may also be provided by a piece of radioactive element mounted within the tube portion 12. Another example is some radioactive element, such as zinc[65] which is so radioactive that enough positrons per second may be obtained therefrom without interfering with the resolution of the device. Carbon[11] produced from carbon[12] radiated by neutrons would also constitute a very good positron source.

Any suitable method of obtaining positrons would be acceptable.

The tube portion 12 comprises similar control accelerating and focusing electrodes as those used in connection with the tube portion 11 and includes control grids 31 and 32, focusing electrode 33 and intensifier electrode 34.

The control electrodes 31 and 32 may again be connected to any suitable sources of bias voltages $C_1'$ and $C_2'$. However, in order to block the stream or flow of positrons the bias voltages $C_1'$ and $C_2'$ must be positive voltages. Appropriate potentiometers 35 and 36 may be connected across the bias voltages $C_1'$ and $C_2'$ to provide for adjustment of the control potentials at these control electrodes 31 and 32.

The focusing electrode 33 is again connected to any suitable focusing voltage, preferably in a manner to provide for adjustment thereof, while the intensifier electrode or accelerating anode 34 is connected, preferably also in an adjustable manner, to the negative high voltage power supply B— to provide for proper acceleration of the positrons.

It is, however, understood that electromagnetic deflection coils may be used also for purposes of focusing the electron beam and for the positron beam.

If further adjustment or variations, such as periodic sweeping of the positron beam, is desired, two pairs of electromagnetic deflection coils 37 and 37' and 38 and 38' may be provided either within the tube portion 12 or on the outside thereof. Of course, electromagnetic deflection plates may be used in the place of the deflection coils.

The approximate annihilation area 40 is indicated by the cross-hatched area located at the intersection of the electron beam and of the positron beam.

As pointed out above, when an electron collides with a positron a gamma ray or X-ray is given off to indicate such collision. The gamma rays or X-rays are detected by means of any suitable gamma ray detector or detectors 41 indicated schematically by dashed line around the area of annihilation 40.

Gamma ray detectors 41 may be placed near the point of intersection of the path of the electron beam and that of the positron beam. These detectors which may be located either outside or inside the tube 10 and which are intended to measure the X-rays or gamma rays indicative of the contact between the positron and electrons may be of any suitable type, such as, for example, a Geiger tube, a scintillation counter with photo multiplier tube or any other suitable device. It is also understood that one or more gamma ray detectors may be used, if so desired; however, the number of chance coincidences will be reduced if two gamma ray detectors are placed 180° from each other to take advantage of the two 180° gamma rays.

The tube 10 which is evacuated to a predetermined degree may also be provided with an extension 42 on the side of the annihilation area 40 opposite the tube portion 12 to carry off positrons from the annihilation area so as to prevent annihilation of the positrons in the glass of tube 10 near the gamma ray detectors 41 which would produce false indications.

Furthermore, in order to collect those electrons of the beam which do not collide with positrons, a collecting plate 43 may optionally be provided on the side of the annihilation area 40 opposite the tube portion 11, which collecting plate may be connected to any suitable positive voltage supply. A similar collecting plate 44 for collecting the positrons may also be provided as shown. However, plate 44 is connected to a suitable negative voltage.

The first control grids 14 and 31 are so located relative to the source of electrons 13 and of positrons 30 that a predetermined electrostatic potential applied thereto will stop the flow of electrons and positrons respectively from entering the area of the second control grids 15 and 32 respectively so that the flow of electrons and positrons is thereby effectively interrupted. The second control grids 15 and 32 lie behind respective first control grids, i.e., further along the path of travel of the electron beam and the positron beam after passing through the first control grids.

The functioning of the control grids 14, 15, 31, and 32 to which input signals may be applied at the input terminals 14', 15', 31', and 32' respectively will be described more fully hereinafter. It is understood, however, that for some applications only one control grid instead of two may suffice in each portion 11 and 12.

The focusing means which may be either made integral with the tube or which may be located externally thereof, may be either the electrostatic or electromagnetic type and cause a fine stream of particles, i.e., electrons and/or positrons, to flow within the annihilation area 40.

The intensity electrodes 19 and 34 may be made in the form of a metallic grid or anode and are so constructed as to permit the beam or stream of particles accelerated towards the same to pass therethrough.

*Calibration*

The calibration of the instrument is based on the following considerations:

The speed of the particles, i.e., of the electrons and of the positrons, determines the transit time between any two points, for example, between the control grids 15 and 32 and the area of annihilation 40. The accelerating potentials applied to accelerating anodes 19 and 34 determine the speed of the particles because the potential energy in a voltage field equals the kinetic energy thereof.

If a voltage $V_1$ is applied to intensity grid 19 and a voltage $V_2$ applied to intensity grid 34, the transit time for respective particles between the corresponding intensity grid 19 or 34 and the annihilation area 40 is $$t = \frac{\text{Distance between intensity grid and annihilation area}}{(5 \cdot 9317 \times 107)(V_{1 \text{ or } 2})^{1/2}}$$

provided $V < 10K$ volts.

The different transit times between the control grids 14, 15 and 31, 32 and their respective intensity grids 19 and 34 may be readily determined by the difference in absolute potentials on the intensity grids 19 and 34 when two exactly coincident pulses are applied to the control grids of both channels or to the control grid of each channel, if only one control grid is provided in each channel.

A calibration chart may be prepared for each instrument by varying parameters affecting the speed and path of the electrons and positrons such as the input voltages to the control grids and the focusing network and thereupon determining the particular intensity voltages which produce coincidence annihilation.

Ordinarily, the device is operated in such a way as to move the charged particles at thermal speeds, i.e., drifting speeds, just fast enough to move the electrons and positrons through space. At such lower speeds the problems of focusing are much more insignificant and require less expensive apparatus.

However, if speeds greater than thermal speeds are used which permit adequate annihilation, then such greater speeds will improve the resolution of the coincidence circuit to a point up to a theoretical limit of $10^{-23}$ seconds.

If it is assumed that the positrons and electrons would not interact and collide with each other at a distance greater than 10 times their respective radii of $10^{-13}$ cm. which is a very conservative assumption, and if it is further assumed that the positrons and electrons move at thermal speeds of 1 cm. per second then annihilation will take place if they approach each other more closely than $10^{-12}$ cm.

The actual speed of the electrons and positrons may be determined by well-known methods used in connection with the accelerating and focusing networks of electron guns. The particular setting at which annihilation takes place when both the electron and positron stream are triggered simultaneously will provide the information indicative of the speed at which the particles travel.

Under these conditions, namely at a speed of 1 cm. a second, and an interaction corresponding to a time differential of about $10^{-12}$ seconds is possible.

The tube 10 is placed under vacuum as is conventional in such vacuum type electron guns, and all controls are preferably placed within the tube.

The various speed controls which may be used in the gun of the present invention include such speed controls as the "Van de Graaff" high pressure gas under heavy ionizing voltage, simple television or radar focusing networks, simple R.F. accelerating lines, magnetic focusing or electrostatic focusing and resistor networks, which may also be used to determine the speed of the respective particles.

The plates 43 and 44 must be so arranged that any radiation given off when the particles impinged thereon does not interfere with the determination of the presence of X-rays or gamma rays caused by the interaction of the electrons and positrons.

Figure 2 is substantially identical with Figure 1 and similar reference numerals have been applied thereat. However, Figure 2 shows additional networks to determine the phase relationship of two pulses.

The embodiment shown in Figure 2 is substantially similar to that of Figure 1, and like reference numerals are used therein to designate like parts and prime numerals are used to indicate corresponding parts. It is noted, however, that focusing coils 18' and 33' are used in this embodiment instead of focusing control electrodes.

The control grid 14 of tube portion 11 of Figure 2 is connected to the cathode 13 through a network consisting of a parallel arrangement of capacitor 51 and resistor 52. The control grid 14 is also connected to the output or plate circuit of an amplifier 53 through resistor 54 and a rectifier element 55 connected with its positive terminal to the resistor 54 and with its negative terminal to the output circuit of tube 53.

The second control grid 15 is connected to the cathode 13 through resistor 56. The second control grid 15 is also connected to the plate or output circuit of tube 53 through a capacitor 57 and a rectifier 58, the latter being connected with its negative terminal to the capacitor 57 and with its positive terminal to the output circuit of the amplifier 53.

The tube portion 12 again comprises a source of positrons 30 which is located within a metal casing 30' provided therefor. The input circuits to the control grids 31 and 32 contain similar elements as those used in connection with the control grids 14 and 15 of the tube portion 11, and, accordingly, are designated by primed reference numerals. It should be noted, however, that the terminals of rectifiers 55' and 58' are reversed with respect to those of the rectifiers 55 and 58, since the positrons are oppositely charged with respect to the electrons, and, therefore, require opposite polarities in the control voltages to perform the same control functions.

To determine the time phase between a single frequency sine wave, and the same cycle after it has been delayed in transit time, as, for example, in a radar system, a sine wave is produced in the output circuit of tube 53 and is applied to grids 14 and 15 through elements 54 and 55 and through elements 57 and 58 respectively.

It is preferable to modulate the sine waves by some low frequency to produce a marker pip, which preferably should decay after the first cycle to clearly distinguish the second cycle. The sharp cut-off marker pip should be recycled in timed duration which is determined by the time resolution of the annihilation gamma-ray detector or detectors.

After a coincident count has been made in the gamma-ray detector the first control grid 14 is biased to cut off so as to interrupt the electron stream for a predetermined time dependent on the time resolution of the gamma-ray detector. This interruption is obtained by the negative half of the sine wave applied thereto through rectifier 55 which applies a predetermined negative charge to the capacitor 51. The electron beam is cut off for a time dependent on the RC time constant of the capacitor 51 and the resistor 52 which determines the time for the charge to leak off. During that time, the application of positive pulse to control grid 15 will not result in the flow of electrons since the presence of the negative bias will continue to prevent the same. When the charge on capacitor 51 has leaked off sufficiently a positive voltage applied to control grid 15 will again pulse a packet of electrons to flow through the tube portion 11. The first part of the sine wave, namely the positive half cycle is coupled to the control grid 15 through rectifier 58 and capacitor 57. Capacitor 57 and resistor 56 constitute a differentiation network having a fixed time constant which shortens the positive pulse to limit the time during which the control grid 15 is positively charged.

After a packet of particles, such as electrons, is thus permitted to flow through the control grid 14 and 15 the negative half of the first cycle of the sine wave in the output circuit of tube 53 again biases the control grid 14 to cut off for a predetermined time to allow discrete counts to be taken in the gamma-ray detector. After a finite length of time, the condenser 51 will again lose its charge through the leakage path provided by resistor 52 so that the flow of electrons may again be pulsed by the application of another positive pulse to control grid 15.

The circuit used in connection with the tube portion 12 for the positron beam is identical with the one of tube portion 11 and operates in an identical manner. However, the output from tube 53' must be inverted by 180° and the terminals of rectifiers 55' and 58' must also be inverted so as to take care of the opposite charge of the positrons with respect to the electrons.

The sine waves produced in the output circuits of tubes 53 and 53' should be marked by pulses or modulations so as to enable to select the proper cycle for phase measurements. A steep logarithmic decrement after the marker pip will greatly improve the selection and data.

Of course, non-sinusoidal voltages and pulses may be used instead of sine waves in the output circuit of tubes 53 and 53'.

The electron tube is initially adjusted by applying to both tube portions 11 and 12 signals from the output tubes 53 and 53' which merely bear a 180° phase relationship with respect to each other. The various controls are then adjusted to produce coincidence. If now a delay is inserted in the input to the tube 53 or 53', as, for example, if the pulse were delayed by an amount equal to the time necessary to travel to and from an object, as in connection with radar systems, coincidence will no longer be realized and no gamma rays will be given off.

It will now be necessary to vary the intensity grid voltages of one or the other or both of the grids 19 and 34 to produce again coincidence. When coincidence is noted in the gamma ray detectors 41 and 41', the time delay may be readily obtained from a reading of the particular voltage used in connection with the intensity grids, as determined from the calibration chart which was obtained in the manner previously described.

Figure 3 illustrates a further embodiment in which the amplifier tubes 53 and 53' are replaced by a cathode follower 60 and an amplifier tube 61. The input signals to the control grids 14, 15, 31, and 32, and the interconnecting circuits between the control grids and respective cathodes are identical with those of Figure 2 and similar reference numerals are used in Figure 3.

The tube 60 comprises a cathode 62, a control grid 63 and a plate 64 the latter being connected to B+. The input to the cathode follower circuit is applied to the cathode 62 thereof through capacitor 65. The cathode is interconnected with the ground through a parallel LC network including capacitor 66 and inductance 67 connected in series with a resistor 68.

The amplifier tube 61 comprises a cathode 69, a control grid 70 and a plate 71, the latter being connected to B+ through a conventional choke. The signal is applied to the plate 71 of the amplifier tube 61 through a coupling capacitor 72. The plate is further coupled to the input circuit of control grids 31 and 32, and more particularly to the terminals of rectifiers 55' and 58' through a coupling capacitor 73 and a parallelly connected LC network consisting of capacitor 74 and inductance 75. The parallel network consisting of elements 74 and 75 is connected to ground at one end thereof whereas the input circuits to the control grids 31 and 32 are connected to a tap of the inductance 75. The control grids 63 and 70 are connected in parallel and a suitable bias voltage (not shown) is applied thereto as indicated in the drawing. The input terminal to the control grids is designated by reference numeral 76. A zero to ninety-degree phase shift network 77 is inserted between input terminal 76 and control grid 63.

The input circuit to control grids 14 and 15, and more particularly to one terminal of rectifiers 55 and 58 is connected to a tap provided on inductance 67.

In order to determine the time interval between a random pulse and a second pulse always following the random pulse at a certain time interval $t$ a continuous sine wave is derived from tubes 60 and 61 and is coupled into the respective input circuits of the tube 10 as shown in the drawing. The amplitudes of the sine waves applied to the input 76 are so adjusted that no annihilation coincidence occurs and none will, therefore, be noted in the gamma-ray detectors 41 and 41'.

If a random pulse is applied to the positive portion of the since wave at the cathode of tube 60 then it will trigger the tube portion 11 to permit the flow of an electron packet. The flyback effect of the LC circuit 67 and 66 will produce a negative cycle sufficient to cut off the control grids 14 and 15 so that subsequent pulses will not open the electron flow for a finite time.

The coincident pulse occurring later in time by an amount of time $t$ is applied to the plate 71 of tube 61. This subsequent pulse must be a negative pulse. The same sine wave which was used as a pedestal to open the electron channel of the tube portion 11 is used to open the positron channel of the tube portion 12. However, the phase shift network 77 provides a relative phase shift between the signals applied to control grids 63 and 70. By adjusting the phase shift network 77 a predetermined amount annihilation will occur producing gamma rays which may be detected with a given pulse and a subsequent pulse delayed by an amount equal to $t$ with respect to the first pulse.

The amount of phase shift adjustment of the network 77 and the ratio of the absolute voltages applied to the intensity grids 19 and 34 will determine the coincidence time between the first random pulse and its subsequent random pulse, and the time delay therebetween may then be accurately determined from the knowledge of the absolute values of these elements to produce coincidence.

While I have shown triodes it is understood that other types of tubes may be used. Similarly, any rectifier element may be used, as, for example, diodes, selenium cells, crystal detectors, etc.

It is also understood that other types of wave forms, either symmetrical or asymmetrical wave forms, may be used for the sine waves mentioned hereinabove.

Furthermore, the particular geometrical shape of tube 10 and tube portions 11, 12, and 42 thereof may be varied to suit the particular purposes of a given case. For example, the plate 43 may also be located in an extension of tube portion 11 in the opposite direction with respect to the annihilation area, similar to extension 42.

While I have shown and described several preferred embodiments of my invention and the use thereof, it is understood that the same is susceptible of various changes and modifications without departing from the spirit of my invention, and I intend to cover such changes and modifications except as limited by the appended claims.

I claim:

1. Apparatus having an annihilation area for determining the time relationship between two pulses comprising means for producing two beams of oppositely charged particles, means for effecting the arrival of said oppositely charged particles at said annihilation area and for controlling the arrival timewise with respect to said pulses, and means for determining the time relationship of said pulses by detecting the annihilation products resulting from collision of oppositely charged particles.

2. Apparatus for determining the time relationship between two pulses comprising means for producing two beams of oppositely charged particles, means for effecting movement of said oppositely charged particles toward a collision area in predetermined timed relationship to said pulses, means for adjusting the relative speed of oppositely charged particles in said beams to produce collision thereof, and means for determining the time relationship of said pulses by detecting the annihilation products resulting from collision of oppositely charged particles.

3. Apparatus having an annihilation area for determining the time relationship between two successive pulses comprising means for triggering two beams of oppositely charged particles by said pulses, means for effecting the arrival of oppositely charged particles at said area and for controlling the arrival timewise with respect to said pulses, and means for determining the time relationship of said pulses by detecting the annihilation products resulting from collision of oppositely charged particles.

4. Apparatus for comparing the time relationship between two pulses comprising means for producing two beams of oppositely charged particles by said pulses, means for effecting movement of said oppositely charged particles toward a collision area in predetermined timed relationship to said pulses, and means for adjusting the relative speed of oppositely charged particles in said beams to interact and produce annihilation radiation, said last-mentioned means including means for comparing the values of parameters upon which the speeds of said beams are dependent when annihilation radiation exists in order to determine the time relationship between said pulses.

5. Apparatus having an annihilation area for determining the time relationship between two successive pulses comprising means for triggering two respective beams of oppositely charged particles by said pulses, means for effecting movement of said oppositely charged particles toward a collision area in predetermined timed relationship to said pulses, means for adjusting the relative speed of oppositely charged particles in said beams to control the time of arrival of said oppositely charged particles at said area, and means for determining the time relationship of said pulses by detecting the annihilation products resulting from collision of oppositely charged particles.

6. Apparatus with an annihilation area for determining the time relationship between two successive pulses comprising a source of negatively charged particles, a source of positively charged particles, means for producing two beams of oppositely charged particles, means for triggering said beams by said pulses, respectively, and for causing oppositely charged particles in said triggered beams to arrive at said annihilation area, means for adjusting the arrival at said annihilation area of said triggered beams of particles, and means for determining the time relationship of said pulses by detecting the annihilation products resulting from collision of oppositely charged particles.

7. Apparatus with an annihilation area for determining the time relationship between two successive pulses comprising means for triggering two respective intersecting beams of oppositely charged particles by said pulses, means for producing collision of the pulsed beams of oppositely charged particles in said area, and means for determining the time relationship of the pulses by observing the presence of annihilation products resulting from collision of oppositely charged particles.

8. The method of determining the time relationship between two pulses comprising the steps of producing in predetermined relationship to said pulses two packets of oppositely charged particles, respectively, movable into a collision area, adjusting the speed of two oppositely charged particles to effect collision thereof, detecting the collision by the presence of radiation given off by the annihilation of the oppositely charged particles, and measuring differences in controlling parameters necessary to produce collision to establish by said measured differences the time interval between said pulses.

9. The method of determining the time relationship between two successive pulses comprising the step of adjusting the speed of two oppositely charged particles moving in intersecting paths in predetermined relationship to said pulses to effect collision thereof, comparing the control parameters upon which the speed and path of said charge particles is dependent to determine the time interval between said two pulses.

10. The method of determining the time relationship between two pulses comprising the steps of triggering two beams of oppositely charged particles is response to said pulses, respectively, controlling the movement of particles in the two beams toward a collision area to effect collision of the oppositely charged particles thereof, and measuring differences in controlling parameters necessary to produce collision to establish by said measured differences the time interval between said pulses.

11. The method of determining the time relationship between two pulses comprising the steps of pulsing two beams of oppositely charged particles by said two pulses, respectively, controlling the movement of particles in said two beams to effect collision of the oppositely charged particles in a predetermined region, detecting the collision by the presence of radiation given off by the annihilation of the oppositely charged particles, and measuring differences in controlling parameters necessary to produce collision to establish by said measured differences the time interval between said pulses.

12. The apparatus in accordance with claim 3 wherein said triggering means includes means for blocking the flow of charged particles for a predetermined time dependent on the time resolution of the detectors of the annihilation products.

13. The apparatus in accordance with claim 12 wherein said blocking means includes at least one resistance capacitor network.

14. Apparatus for measuring the duration of an interval of time comprising a source of positively-charged particles, a source of negatively-charged particles, means for releasing a packet of particles from one of said sources at the beginning of said time interval, means for releasing a packet of particles from the other of said sources at the end of said time interval, means for guiding said packets of particles to interact in a predetermined area, means for controlling the speed of said packets from said sources to said area to effect interaction of said packets producing annihilation thereof to determine said duration.

15. The method of determining the duration of a time interval comprising the steps of initiating movement of a first packet of charged particles at the beginning of said time interval, initiating movement of a second packet of oppositely-charged particles at the end of said time interval, controlling the speeds and direction of said packets to interact at a predetermined area by annihilation of said particles, and comparing the parameters, affecting the speed and path of movement of said packets to produce interaction, to obtain information indicative of the duration of said interval.

References Cited in the file of this patent

UNITED STATES PATENTS

| | | |
|---|---|---|
| 2,543,859 | Long | Mar. 6, 1951 |
| 2,563,472 | Leverenz | Aug. 7, 1951 |

OTHER REFERENCES

Introduction to Atomic and Nuclear Physics, by Henry Semat, pp. 341, 342, 343.